US012671183B2

(12) United States Patent
Chivukula

(10) Patent No.: US 12,671,183 B2
(45) Date of Patent: Jun. 30, 2026

(54) DUAL BAND ANTENNA FOR L AND K/Ka COMMUNICATION

(71) Applicant: Honeywell International Inc., Charlotte, NC (US)

(72) Inventor: Rajesh Chivukula, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 143 days.

(21) Appl. No.: 18/524,482

(22) Filed: Nov. 30, 2023

(65) Prior Publication Data

US 2024/0421489 A1 Dec. 19, 2024

(30) Foreign Application Priority Data

Jun. 15, 2023 (IN) ............................ 202311040787

(51) Int. Cl.

| | |
|---|---|
| ***H01Q 9/04*** | (2006.01) |
| ***H01Q 1/02*** | (2006.01) |
| ***H01Q 1/52*** | (2006.01) |
| ***H01Q 21/06*** | (2006.01) |

(52) U.S. Cl.
CPC ............. *H01Q 9/0414* (2013.01); *H01Q 1/02* (2013.01); *H01Q 1/523* (2013.01); *H01Q 1/526* (2013.01); *H01Q 21/065* (2013.01)

(58) Field of Classification Search
CPC ........ H01Q 9/0414; H01Q 1/02; H01Q 1/523; H01Q 1/526; H01Q 21/065
See application file for complete search history.

(56) References Cited

U.S. PATENT DOCUMENTS

| | | |
|---|---|---|
| 5,160,936 A | 11/1992 | Braun et al. |
| 6,650,291 B1 | 11/2003 | West et al. |
| 7,068,222 B2 | 6/2006 | Koparan et al. |
| 7,427,967 B2 | 9/2008 | Hughes |
| 8,462,071 B1 | 6/2013 | Rudish et al. |

(Continued)

FOREIGN PATENT DOCUMENTS

| | | |
|---|---|---|
| CN | 111834747 A | 10/2020 |
| CN | 212783801 U | 3/2021 |

(Continued)

OTHER PUBLICATIONS

Extended European Search Report Mailed on Apr. 23, 2024 for EP Application No. 23210573, 12 page(s).

(Continued)

*Primary Examiner* — Hai V Tran
(74) *Attorney, Agent, or Firm* — ALSTON & BIRD LLP

(57) ABSTRACT

Antennae, controllers, and/or the like are provided. In some embodiments, an antenna may include a chassis; a plurality of printed circuit boards (PCBs) disposed on or within the chassis, a plurality of L-band antenna elements configured to transmit and receive data through satellite communication; a plurality of K/Ka-band antenna elements configured to transmit and/or receive data, wherein the plurality of L-band antenna elements and the plurality of K/Ka-band antenna arrays are disposed on the plurality of PCBs; and a controller disposed on the plurality of PCBs and configured to control the plurality of L-band antenna elements and the plurality of Ka-band antenna elements.

19 Claims, 15 Drawing Sheets

(56) References Cited

U.S. PATENT DOCUMENTS

| | | | | |
|---|---|---|---|---|
| 10,103,441 | B2 | 10/2018 | Legare | |
| 10,381,725 | B2 | 8/2019 | Iancu et al. | |
| 11,139,550 | B2 | 10/2021 | Yang | |
| 11,476,578 | B2 | 10/2022 | Chivukula | |
| 2003/0164797 | A1 * | 9/2003 | Ngai | H01Q 1/523<br>343/700 MS |
| 2006/0044189 | A1 * | 3/2006 | Livingston | H01Q 19/005<br>343/700 MS |
| 2015/0015453 | A1 | 1/2015 | Puzella et al. | |
| 2020/0021019 | A1 * | 1/2020 | Rajagopalan | H01Q 1/2291 |
| 2021/0143548 | A1 * | 5/2021 | Chivukula | H01Q 1/48 |
| 2021/0175596 | A1 * | 6/2021 | Migliorino | H01Q 1/02 |
| 2021/0210855 | A1 | 7/2021 | Yue et al. | |
| 2021/0223380 | A1 | 7/2021 | Chi et al. | |
| 2022/0302603 | A1 | 9/2022 | Chieh et al. | |
| 2022/0308165 | A1 | 9/2022 | Teague et al. | |
| 2022/0407233 | A1 * | 12/2022 | Woo | H04B 7/0617 |
| 2024/0195060 | A1 * | 6/2024 | Chivukula | H01Q 9/0407 |

FOREIGN PATENT DOCUMENTS

| | | | |
|---|---|---|---|
| CN | 114039216 | A | 2/2022 |
| EP | 0720252 | A1 | 7/1996 |
| WO | 2010/106396 | A1 | 9/2010 |

OTHER PUBLICATIONS

Extended European Search Report Mailed on Nov. 13, 2024 for EP Application No. 24177730, 11 page(s).

H. Schippers et al., “Development of Dual-Frequency Airborne Satcom Antenna with Optical Beamforming,” Aerospace Conference, IEEE, 1-16, (Mar. 7, 2009).

Ivan Russo et al., “Dual-Band Antenna Array With Superdirective Elements for Short-Distance Ballistic Tracking,” IEEE Transactions on Antennas and Propagation, 67(1):232-241, (2019).

* cited by examiner

DUAL BAND ANTENNA FOR L AND K/Ka COMMUNICATION

TECHNICAL FIELD

The present disclosure relates generally to electronically steerable antennae, and in particular, it relates to a modular, scalable low-profile, and electronically steerable antenna for L and/or K/Ka band communication.

BACKGROUND

L-band terminals allow resilient communication for antennae at low data rates (100-700 kbps), while K/Ka-band terminals allow high data rate communication (10s/100s Mbps) for antennae in geostationary earth orbit (GEO), medium-earth orbit (MEO), and low-earth orbit (LEO). L-band terminals (e.g., for command and control operations) work with 10 dBW to 21 dBW (depending on terminal type) and work with lower power devices, while K/Ka-band terminals require high power during operation (e.g., approximately 52 dBW for transmitting and approximately 14 dB/K for receiving in GEO), which may limit their use in aerospace platforms, particularly smaller aerospace platforms like UAS and UAM.

Through applied effort, ingenuity, and innovation, Applicant has solved problems relating to L and K/Ka-band terminals by developing solutions embodied in the present disclosure, which are described in detail below.

SUMMARY

In general, embodiments of the present disclosure provide L/K/Ka band antennae and/or the like.

In accordance with various embodiments of the present disclosure there is provided an antenna including: a chassis; a plurality of printed circuit boards (PCBs) disposed on or within the chassis, a plurality of L-band antenna elements configured to transmit and receive data through satellite communication; a plurality of K/Ka-band antenna arrays configured to transmit and/or receive data, wherein the plurality of L-band antenna elements and the plurality of K/Ka-band antenna arrays are disposed on the plurality of PCBs; and a controller disposed on the plurality of PCBs and configured to control the plurality of L-band antenna elements and the plurality of K/Ka-band antenna arrays.

In some embodiments, the chassis further includes one or more heatsinks.

In some embodiments, the plurality of K/Ka-band antenna arrays include 4×4, 8×8, or 16×16, or 64×64 K/Ka-band arrays.

In some embodiments, the antenna further includes one or more ground planes for the L-band elements and K/Ka band antenna arrays.

In some embodiments, the antenna further includes a metallic fencing electrically connected to the one or more ground elements and configured to separate two or more of the plurality of L-band antenna elements.

In some embodiments, the metallic fencing is meshed fencing.

In some embodiments, a multilayer PCB of the plurality of PCBs includes a plurality of L-band slots and a plurality of K/Ka band slots.

In some embodiment, the plurality of L-band antenna elements include a mesh corresponding to the plurality of L-band slots, wherein the K/Ka-band antenna arrays are further configured to transmit and/or receive data through the mesh.

In some embodiments, the plurality of K/Ka-band antenna arrays include a plurality of K/Ka patches corresponding to the plurality of K/Ka-band slots.

In some embodiments, the K/Ka-band antenna arrays are further configured to transmit and/or receive data through the L-band meshed antenna elements in GEO, LEO, or MEO.

In some embodiments, the plurality of L-band antenna elements include a plurality of L-band patches.

In some embodiments, the plurality of L-band patches include a plurality of L-band perforated top patches and a plurality of L-band perforated bottom patches, wherein the plurality of L-band perforated top patches are disposed on a first PCB of the plurality of PCBs, wherein the plurality of L-band perforated bottom patches are disposed on a second PCB, and wherein the second PCB is positioned below the first PCB.

In some embodiments, the plurality of L-band slots are disposed on a third PCB of the plurality of PCBs, and wherein the third PCB is positioned below the first PCB and the second PCB.

In some embodiments, the antenna further includes one or more sub-miniature push-ons (SMPs) disposed on the third PCB.

In some embodiments, the controller is disposed on a fourth PCB of the plurality of PCBs, and wherein the fourth PCB is positioned below the first, second, and third PCBs.

In some embodiments, the antenna further includes one or more RF chains disposed on the third and fourth PCBs.

In some embodiments, the antenna further includes one or more frames disposed between the plurality of PCBs.

In some embodiments, the one or more frames include an electromagnetic interference (EMI) shielding configured to shield the plurality of L-band antenna elements.

In some embodiments, the plurality of PCBs are disposed within the chassis such that one or more airgaps exist between two or more PCBs of the plurality of PCBs.

In some embodiments, the one or more airgaps separate the two or more PCBs at a distance between 5 and 10 millimeters.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

A dual-band antenna may provide for communication through satellites at low (L-band) and high data rates (K/Ka-band) for aerospace platforms in GEO, LEO, and MEO. In some embodiments, a dual-band antenna may be used in aerospace applications, such as UAV command and control (using the L-band) and high-speed data transmission (using the K/Ka-band). Incorporating separate L and K/Ka-band elements may take up unnecessary amounts of space and/or require significant power consumption; this incorporation may also lead to incompatibility with different chipsets. According to various embodiments, a combined L-band and K/Ka band antenna is disclosed that optimizes power consumption, considers space concerns, and enables communication in multiple bands.

An antenna may be contained in a single line replacement unit (LRU) and may include multiple printed circuit boards (PCBs) containing dual band antenna elements for toggling the antenna between different communication bands. In some embodiments, the antenna may operate in the L-band and K/Ka-band and switch between these two bands as desired. In some embodiments, the printed circuit boards may be disposed within a chassis including one or more heat sinks. In some embodiments, the plurality of L-band antenna elements may be configured for satellite communication and the plurality of K/Ka-band antenna elements may be configured to transmit and receive data. In some embodiments, the L-band antenna elements may be configured for command-and-control operations while the K/Ka-band antenna arrays may be configured for periodically transmitting high-speed data.

Example Antennae

Figure 1:
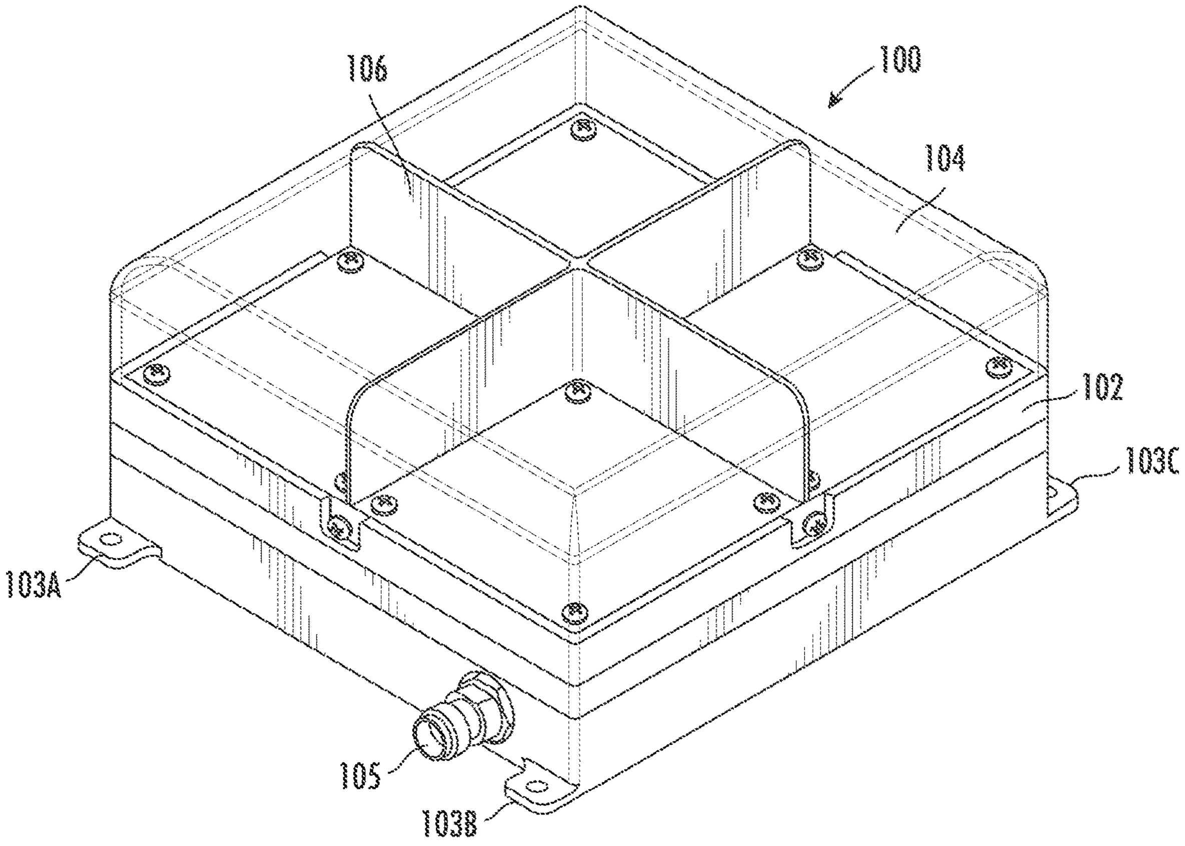
FIG. 1 is an isometric view of an example antenna in accordance with various embodiments of the present disclosure.

FIG. 1 shows an isometric view of an example antenna 100 in accordance with various embodiments of the present disclosure. In some embodiments, the antenna 100 may have a compact, lightweight design. In some embodiments, the antenna 100 may have dimensions of approximately 5.5 inches in length, 5.5 inches in width, and 2.2 inches in height. In some embodiments, the antenna 100 may be configured for L and/or K/Ka-band communication. In some embodiments, the antenna 100 may be an LRU or part of an LRU and attached to an aerospace platform (e.g., an unmanned aerial vehicle or a satellite in LEO, MEO, or GEO). Additionally or alternatively, in some embodiments, the antenna 100 is a subcomponent of another vehicle, for example a ground traversing vehicle or a water traversing vehicle.

In some embodiments, the antenna 100 may include a chassis 102. In some embodiments, the chassis 102 may be configured to hold in place, and/or contain, one or more components of the antenna 100. In some embodiments, the chassis 102 may be substantially rectangular in shape. In some embodiments, the chassis 102 may include one or more fastening points 103A-D through which one or more fasteners may be inserted or otherwise attached to connect the chassis 102 to a surface. In some embodiments, the chassis 102 may be substantially metallic, plastic, or composed of a composite material. In some embodiments, and as shown in more detail in at least FIG. 2, the chassis 102 may include multiple component parts that fit together.

In some embodiments, the chassis 102 may be attached to a case 104. In some embodiments, the case 104 may be a radome composed of one or more materials configured to facilitate the passage of radio waves through the case 104. In some embodiments, the case 104 may be transparent or translucent and configured to allow a viewer to observe one or more components of the antenna 100. In some embodiments, the case 104 may be plastic or glass or composed of a similar material. In some embodiments, the case 104 may be configured to protect one or more components contained within the chassis 102. In some embodiments, the antenna 100 may include a TNC connector 105 that may be fixedly attached to the chassis 102. In some embodiments, the TNC connector 105 may be configured to receive a coaxial cable to connect the antenna 100 to one or more electrical devices.

In some embodiments, a fencing 106 may be placed on the chassis 102 or otherwise extend above the chassis 102. In some embodiments, the fencing 106 may extend up to 5 mm above the chassis 102. In some embodiments, the fencing 106 may be placed on the chassis 102 such that the fencing 106 divides the chassis 102 into quadrants or other sections. In some embodiments, the fencing 106 may be perforated with one or more holes; that is, in some embodiments, the fencing 106 may be meshed. In some embodiments, the one or more holes in the fencing 106 may be configured to permit K/Ka-band radiation to pass through. In some embodiments, the fencing 106 may extend between individual array elements of the antenna. In some embodiments, the fencing 106 may be a crossed metallic fence electrically connected to a ground plane. In some embodiments, the fencing 106 may be electrically connected to a ground plane, one or more ground elements, and to one or more heatsinks.

Figure 2:
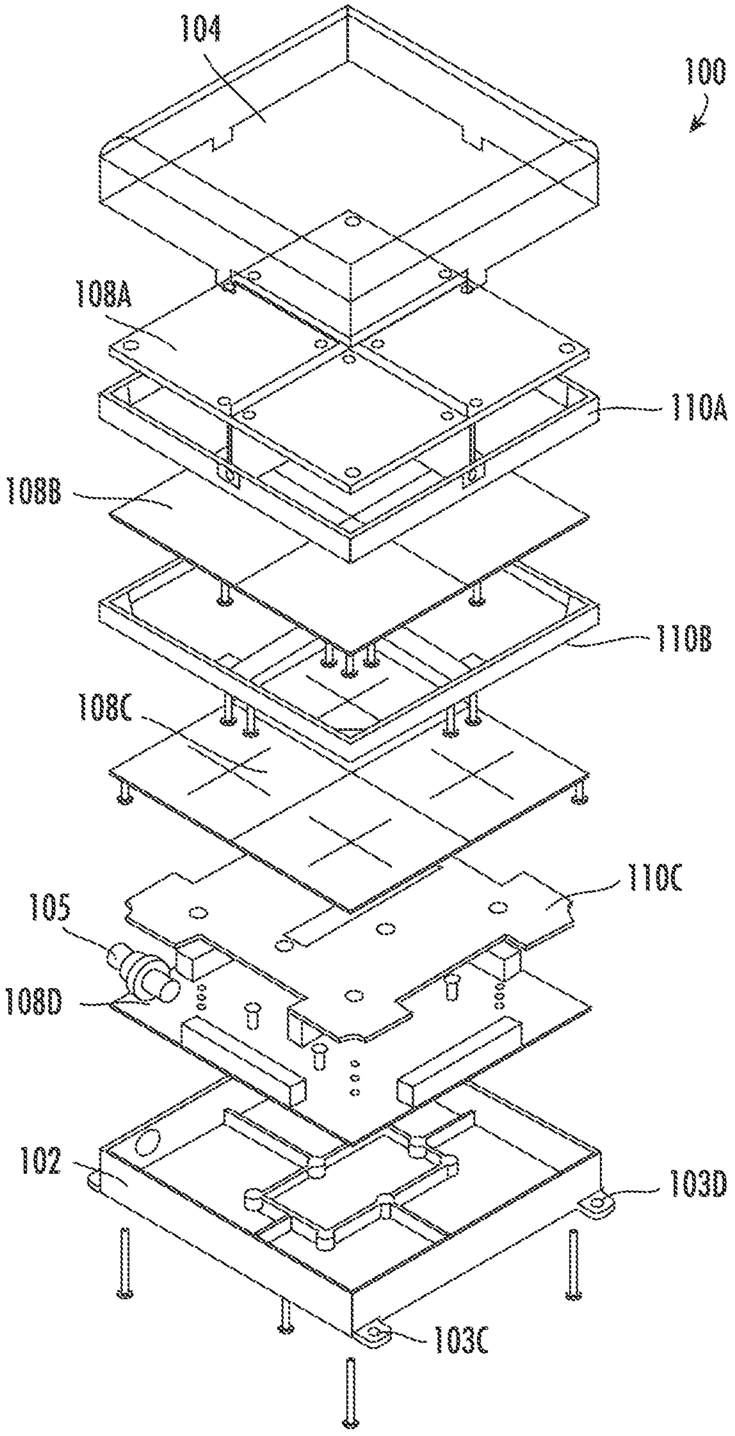
FIG. 2 is an exploded view of an example antenna in accordance with various embodiments of the present disclosure.

FIG. 2 is an exploded view of the example antenna 100 in accordance with various embodiments of the present disclosure. In some embodiments, the antenna 100 may include one or more printed circuit boards (PCBs) 108A-D. Though four PCBs are shown in FIG. 2, it will be understood that the antenna 100 may include more than four PCBs or fewer than four PCBs, as desired.

In some embodiments, one or more airgaps may be disposed between the PCBs 108A-D in the antenna. In some embodiments, the airgaps may span a distance ranging between 5 and 10 mm. In some embodiments, there may be a first PCB 108A, a second PCB 108B, a third PCB 108C, and a fourth PCB 108D. In some embodiments, the first PCB 108A may be positioned above the second PCB 108B, which may be positioned above the third PCB 108C, which may be positioned above the fourth PCB 108D. It will be understood that the stacking arrangement of the PCBs 108A-D may be varied as desired, according to various embodiments.

As shown in at least FIG. 2, in some embodiments, the one or more PCBs 108A-D may be placed within the chassis 102 of the antenna 100. In some embodiments, the one or more PCBs 108A-D may be configured in a stacked arrangement, one on top of the other, within the chassis 102. In some embodiments, and as previously alluded to, the chassis 102 may include one or more frames 110A-C. In some embodiments, the one or more frames 110A-C may be metal frames. In some embodiments, the one or more PCBs 108A-D may be separated within the chassis 102 via the one or more frames 110A-C and/or the airgaps. In some embodiments, one or more of the one or more PCBs 108A-D may be operably engaged to or fixedly attached to one or more of the one or more frames 110A-C. For example, the PCB 108A may be fixedly attached to the frame 110A, the PCB 108B may be fixedly attached to the frame 110B, the PCB 108C may be fixedly attached to the frame 110C, and the PCB 108D may be fixedly attached to and/or placed within the chassis 102, along with the other PCBs 108A-C and frames 110A-C.

Figure 3:
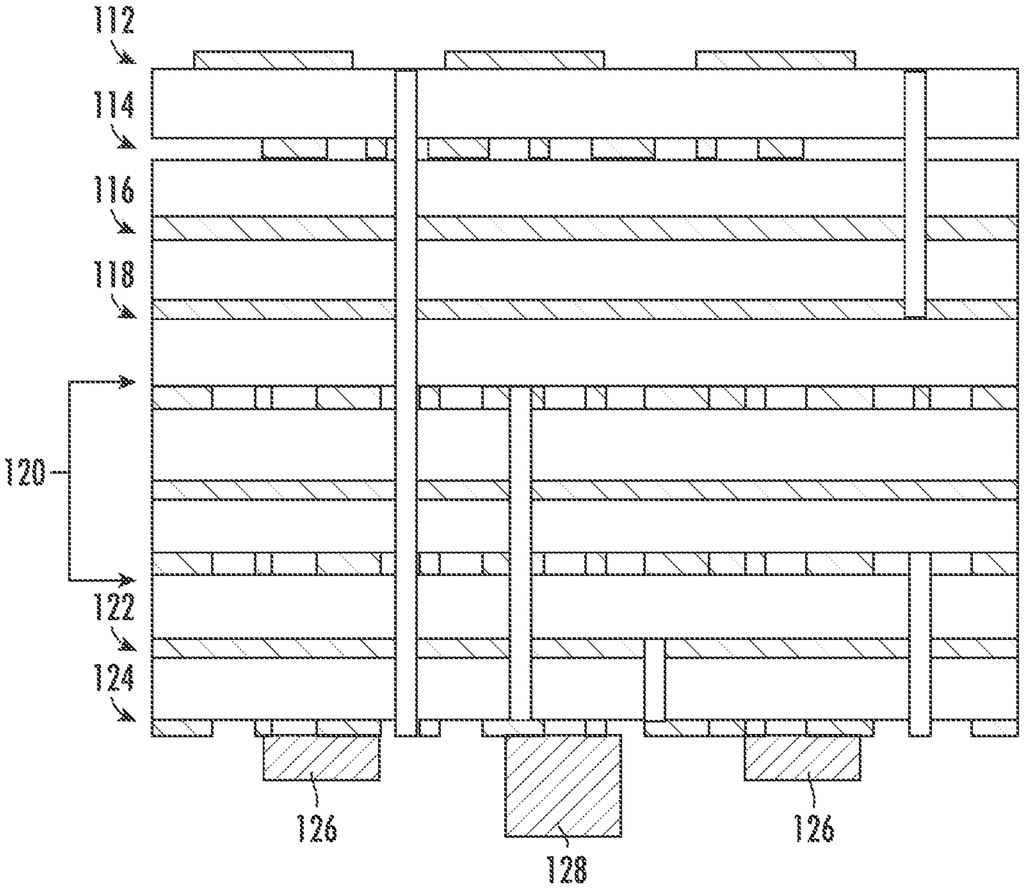
FIG. 3 is a representative side view of an example PCB in accordance with various embodiments of the present disclosure.

FIG. 3 shows a side, representative stack view of an example PCB 108C of the example antenna 100 in accordance with various embodiments of the present disclosure. In some embodiments, the example PCB 108C (and the other PCBs 108A-B and D, as well) may include one or more layers. In some embodiments, the example PCB 108C of the antenna 100 may include various components distributed throughout the one or more PCBs 108A-D and located within the chassis 102 or the case 104.

In some embodiments, the example PCB 108C of the antenna 100 may include one or more K/Ka band (18 to 40 GHz) antenna arrays including one or more K/Ka patches 112, one or more K/Ka feed traces 114, at least one K/Ka ground 116, one or more K/Ka radio-frequency integrated circuit (RFIC) traces 124, and one or more K/Ka RFICs 126. In some embodiments, PCB 108C may include necessary power planes, control lines, and associated electronics to support the RFICs-thereby enabling progressive phase shifts between elements to form a steered beam in the transmit and/or receive band. In some embodiments, the K/Ka band arrays may be stacked patch antennae with aperture coupling through a slot in K/Ka ground 116, or as inset fed stacked patch antennae with coupling from the K/Ka band RFIC layers. In some embodiments, the K/Ka feed traces 114 are coupled to the slots to transfer RF energy to the stacked patch antennae above the ground plane 118. In some embodiments, these various arrays may be stacked or otherwise arranged to be aligned. In some embodiments, the one or more K/Ka band antenna arrays may enable to the antenna 100 to communicate with frequencies ranging between 18 and 40 GHz. In some embodiments, the K/Ka antenna arrays may be configured for highspeed (10s/100s Mbps) data communications in LEO, MEO, and/or GEO. In some embodiments, the K/Ka antenna arrays may be configured for both transmitting and receiving highspeed data communications. In some embodiments, the K/Ka-band antenna arrays may consume a high amount of power. In some embodiments, though the third PCB 108C is shown in FIG. 3, the K/Ka-band antenna arrays may be disposed on both the third PCB 108C and the fourth PCB 108D. In some embodiments, the K/Ka band antenna arrays may be interleaved to form a shared aperture.

In some embodiments, the example third PCB 108C may include at least one L ground plane 118, a power/control element 120 and at least one RF ground 122. In some embodiments, the antenna 100 may also include a sub miniature push-on (SMP) 128. In some embodiments, these various elements may similarly be aligned with each other, as previously described, or aligned with one or more of the K/Ka-band antenna arrays previously described. In some embodiments, the L-ground plane 118, power/control element 120, and at least one RF ground 122 may interact with other elements on separate PCBs 108A-B and 108D within the antenna 100. In some embodiments, the L-ground plane 118 may be operably connected to one or more L-band elements disposed on other PCBs 108A-B and 108D within the antenna 100. In some embodiments, the power/control element 120 may house or otherwise contain the controller 300, as will be described in greater detail later in this disclosure.=

FIGS. 4A-4D show top plan views of various bands and/or layers of an example PCB 108C of the example antenna 100. In some embodiments, and as shown in at least FIG. 4A, a K/Ka-band for the example antenna 100 may include the plurality of K/Ka-band patches 112. In some embodiments, the K/Ka-band patches 112 may be disposed on a first PCB 108A. In some embodiments, the K/Ka-band patches 112 may be distributed in an 8×8 configuration as shown. In some embodiments, there may be more or fewer K/Ka-band patches 112 as desired, in a variety of configurations. For example, in some embodiments, the K/Ka-band patches 112 may be disposed in an 8×8, 16×16, 64×64, or higher configurations.

Figure 4A:
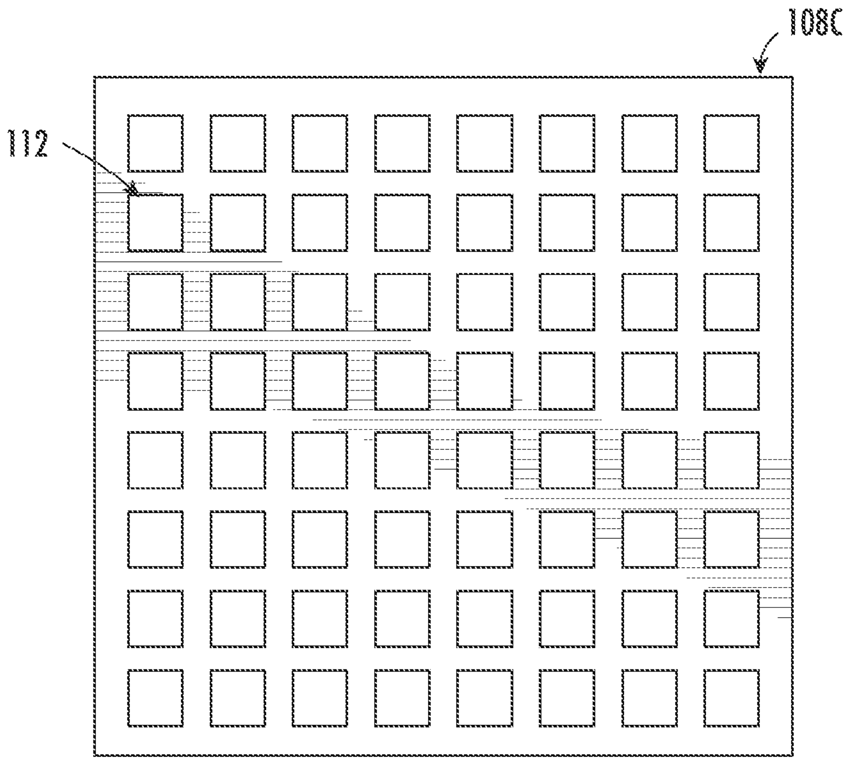
FIG. 4A is a top plan view of example K/Ka band patches of an example PCB in accordance with various embodiments of the present disclosure.
Figure 4B:
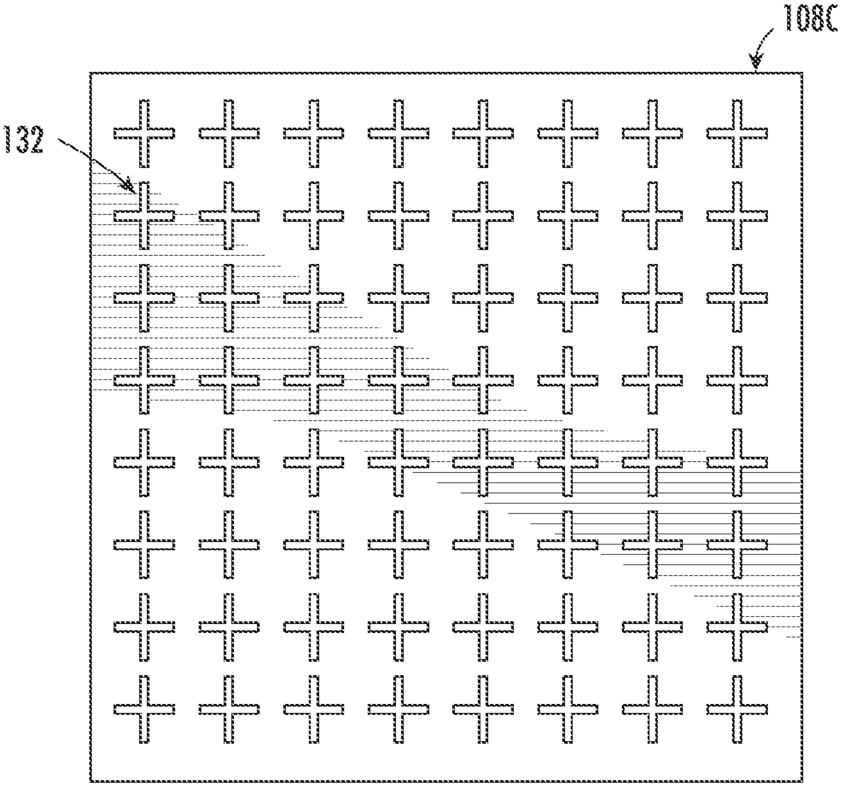
FIG. 4B is a top plan view of an example K/Ka band slot plane of an example PCB in accordance with various embodiments of the present disclosure.

In some embodiments, and as shown in at least FIG. 4B, a K/Ka-band slot plane may include a plurality of K/Ka-band slots 132. In some embodiments, the K/Ka-band slots 132 may be disposed on the third or fourth PCB 108C, 108D. In some embodiments, the K/Ka-band slots 132 may be substantially cross-shaped. In some embodiments, the K/Ka-band slots 132 may correspond to the K/Ka-band patches 112. For example, if the K/Ka-band patches 112 are disposed in an 8×8 configuration (as in at least FIG. 4A), then the K/Ka-band slots 132 may also be disposed in an 8×8 configuration (as in at least FIG. 4B) and aligned with the K/Ka-band patches 112. In some embodiments, the K/Ka-band patches 112 and K/Ka-band slots 132 may be disposed on the same PCB 108A-D on one or more layers within the PCB 108A-D, or they may be disposed on different PCBs.

Figure 4C:
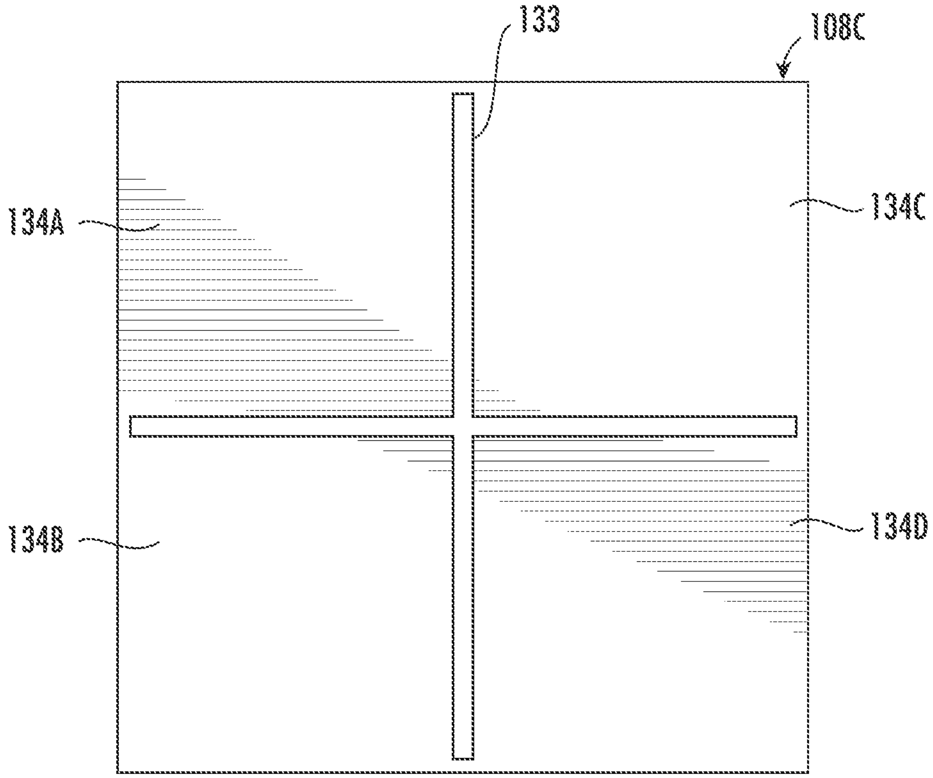
FIG. 4C is a top plan view of an example L-band slot plane of an example PCB in accordance with various embodiments of the present disclosure.

In some embodiments, and as shown in at least FIG. 4C, an L-band slot plane 133 may include one or more sections (e.g., quadrants) 134A-D. In some embodiments, the L-band slot plane 133 may be disposed on a third PCB 108C. In some embodiments, the L-band slot plane 133 may be substantially cross-shaped. In some embodiments, the L-band slot plane 133 may include a plurality of L-band slots disposed on the L-band slot plane 133. In some embodiments, the plurality of L-band slots may correspond to a plurality of L-band patches or other L-band antenna elements disposed on the PCBs 108A-D of the antenna 100.

Figure 4D:
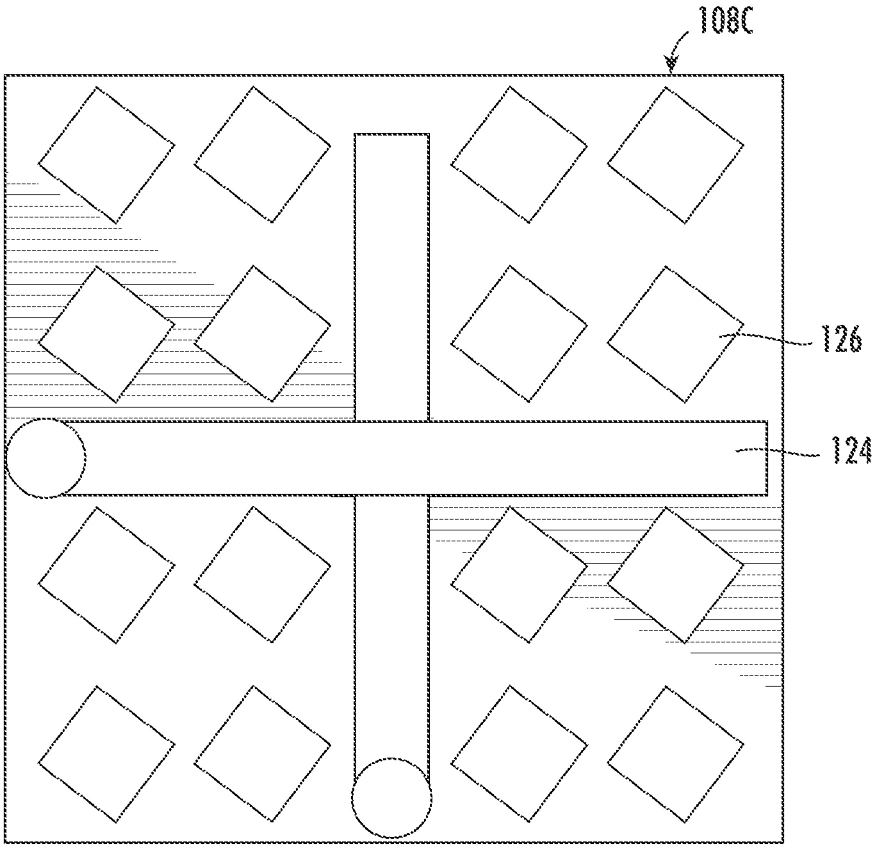
FIG. 4D is a top plan view of an example bottom layer of an example PCB in accordance with various embodiments of the present disclosure.

In some embodiments, and as shown in at least FIG. 4D, a bottom layer of the PCBs 108A-D (e.g., a bottom layer of the third PCB 108C) may include one or more L-band traces 124 and one or more K/Ka RFIC 130. In some embodiments, the L-band traces 124 may correspond with the L-ban slot plane 133 and the plurality of L-band slots. In some embodiments, the one or more K/Ka RFICs 126 may correspond to the K/Ka-band patches 112 and the plurality of K/Ka-band slots 132. In some embodiments, the K/Ka RFICs 126 may provide necessary circuitry for the K/Ka-band antenna arrays and/or various other components of the antenna 100.

Figure 5A:
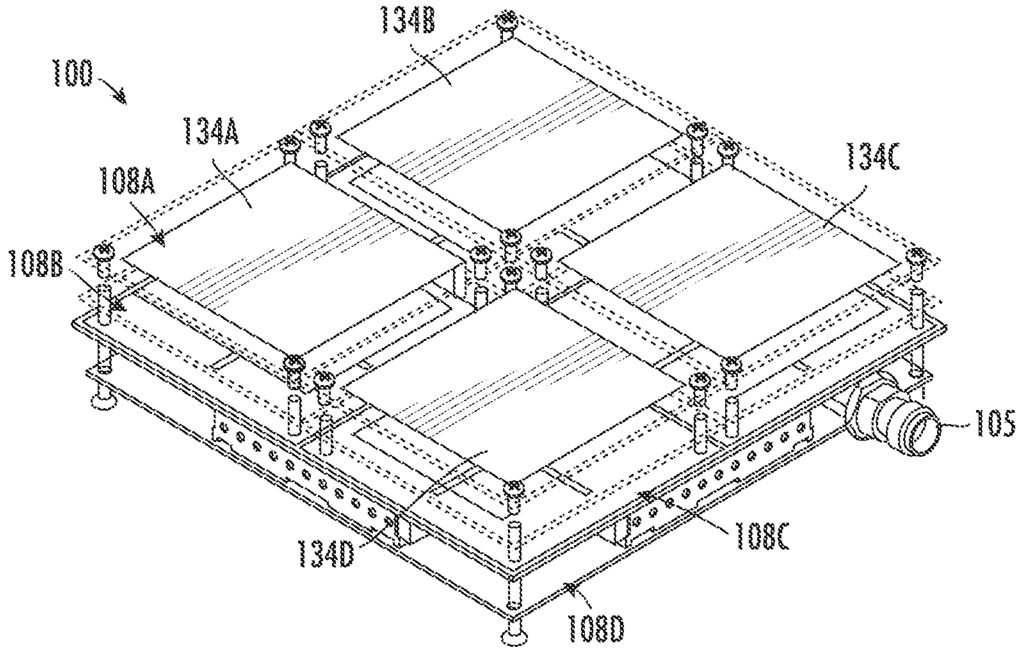
FIG. 5A is an isometric view of example internal printed circuit boards of an example antenna in accordance with various embodiments of the present disclosure.

FIGS. 5A-5D show various views of the example PCBs 108A-D and various layers of the example PCBs 108A-D of the example antenna 100 in accordance with various embodiments of the present disclosure. FIG. 5A shows the PCBs 108A-D outside of the chassis 102. In some embodiments, the first PCB 108A may include four quadrants 136A-D, each which of which may include a patch. In some embodiments, the first PCB 108A may be visible through the case 104. In some embodiments, one or more L-band patches 138 may be placed on the first PCB 108A. In some embodiments, the one or more L-band patches 138 may be perforated patches and may be divided into top and bottom patches, with the top patches disposed on PCB 108A and the bottom patches disposed on PCB 108B and configured to be aligned. In some embodiments, the L-band patches may be meshed to allow for the passage of K/Ka-band signals through the L-band patches.

Figure 5B:
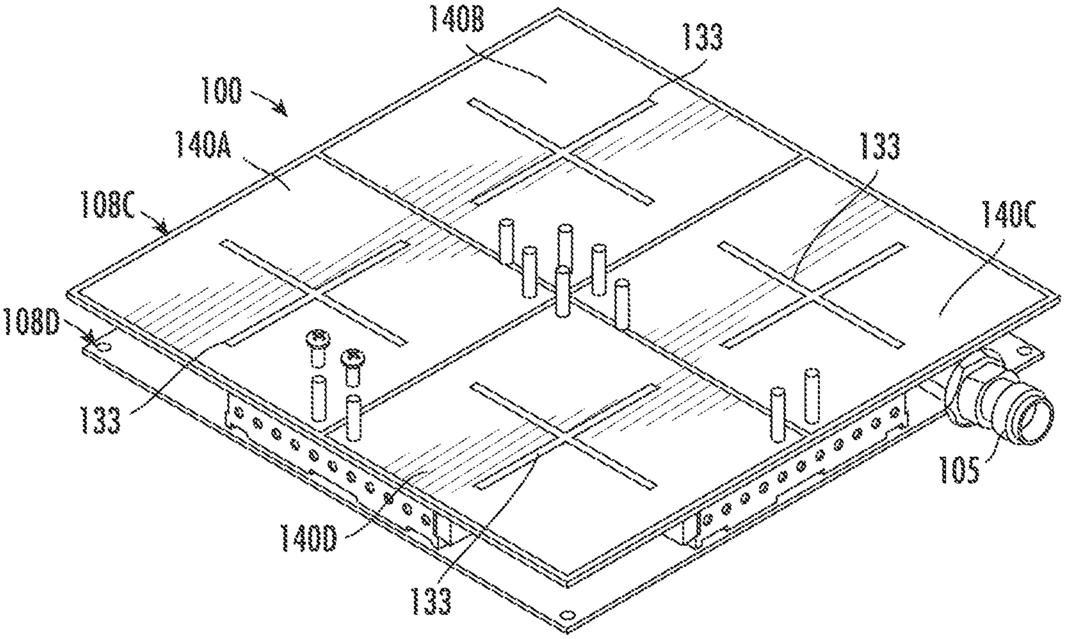
FIG. 5B is isometric view of an example L-band ground plane of an example antenna in accordance with various embodiments of the present disclosure.

FIG. 5B shows the third PCB 108C, according to some embodiments. In some embodiments, the L-band ground plane may be disposed on the third PCB 108C. In some embodiments, the third PCB 108C may include four quadrants 140A-D. In some embodiments, one or more L band slot planes 133 (as seen in at least FIG. 4C), may be disposed on the third PCB 108C.

Figure 5C:
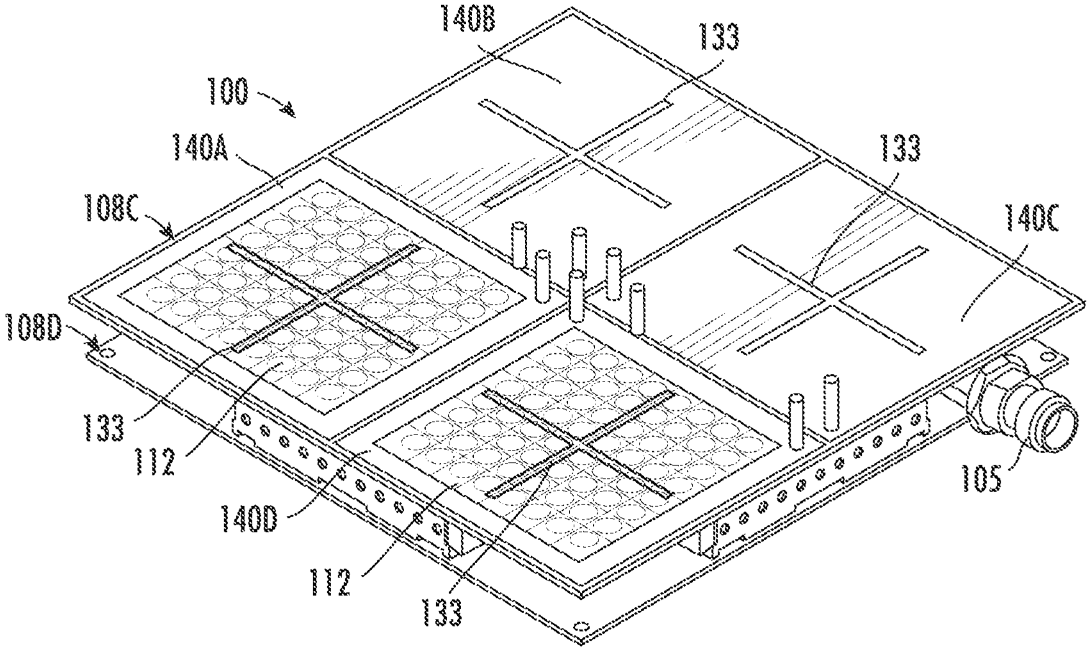
FIG. 5C is an isometric view of example K/Ka-band antenna arrays on an example printed circuit board for an example antenna in accordance with various embodiments of the present disclosure.

FIG. 5C shows the K/Ka-band antenna arrays on the third PCB 108C. In some embodiments, one or more K/Ka patches 112 may be disposed on the third PCB 108C. In some embodiments, the one or more K/Ka patches 112 may be disposed on the first and fourth quadrants (104A and 104D) of the third PCB 108C. In some embodiments, the one or more K/Ka patches 112 may be distributed onto other patches of the third PCB 108C or other patches of the PCBs of the antenna 100.

Figure 5D:
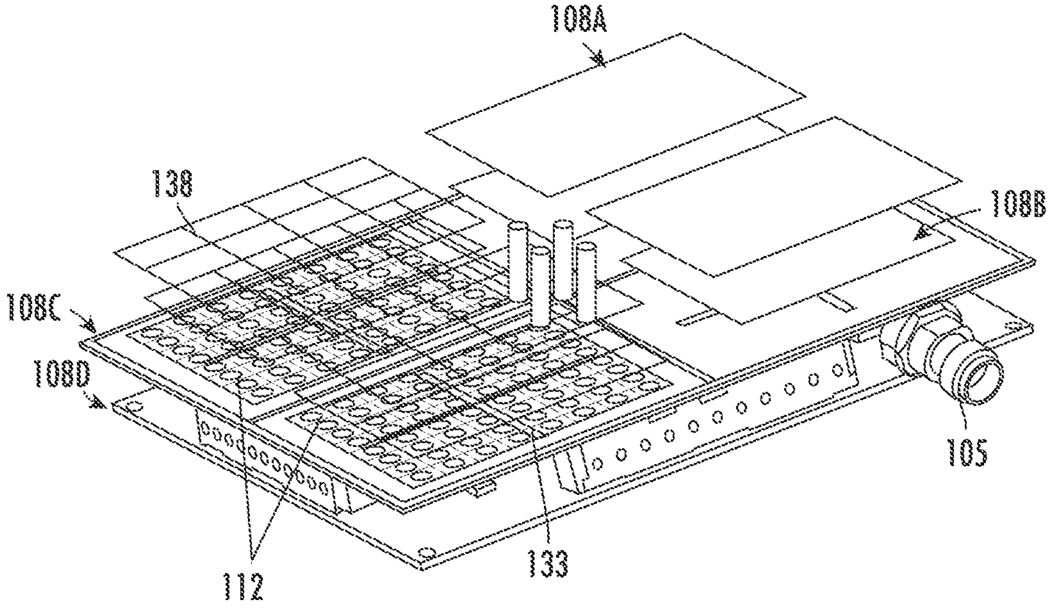
FIG. 5D is an exploded view of an example L/K/Ka band of an example antenna in accordance with various embodiments of the present disclosure.

FIG. 5D shows the K/Ka-band antenna arrays along with the L-band perforated patches 138 positioned above the L-band slots in the L-band slot plane 133, as previously described. In some embodiments, the L-band perforated patches 138 may be disposed above the L-band slot plane 133. In some embodiments, the L-band perforated patches 138 may be meshed such that signals from the K/Ka-band antenna arrays may pass through the L-band antenna elements. In some embodiments, one or more RF chains may be disposed on one or more of the PCBs 108A-108D of the antenna.

Example Controllers

Figure 6:
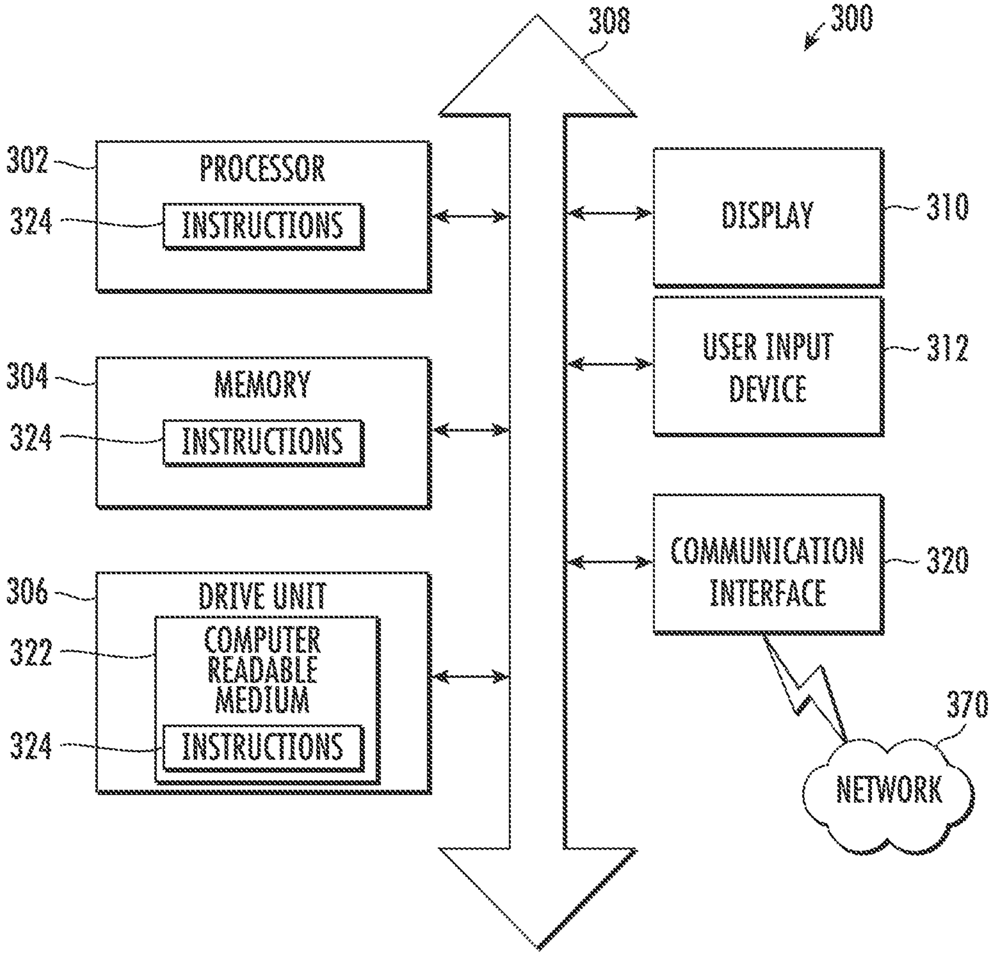
FIG. 6 depicts an example implementation of a controller in accordance with various embodiments of the present disclosure.

FIG. 6 depicts an implementation of a controller 300 that may execute techniques presented herein, according to various embodiments. In some embodiments, the controller 300 may include a set of instructions that can be executed to cause the controller 300 to perform any one or more of the methods or computer based functions disclosed herein. In some embodiments, the controller 300 may operate as a standalone device or may be connected (e.g., using a network, to other computer systems or peripheral devices). In some embodiments, the controller 300 may be housed within or otherwise located in one of the PCBs 108A-D of the antenna 100. In some embodiments, the controller 300 may be integrated into or coupled to the power control element 120 as previously described. In some embodiments, the controller 300 may be configured to change the operation of the antenna 100 from the L-band communication to the K/Ka-band communication, and vice-versa.

In a networked deployment, according to some embodiments, the controller 300 may operate in the capacity of a server or as a client in a server-client user network environment, or as a peer computer system in a peer-to-peer (or distributed) network environment. In some embodiments, the controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In some embodiments, the controller 300 can be implemented using electronic devices that provide voice, video, or data communication. Further, while the controller 300 is illustrated as a single system, in some embodiments, the term "system" shall also be taken to include any collection of systems or sub-systems that individually or jointly execute a set, or multiple sets, of instructions to perform one or more computer functions.

As illustrated in at least FIG. 6, in some embodiments, the controller 300 may include a processor 302 (e.g., a central processing unit (CPU) a graphics processing unit (GPU), or both). In some embodiments, the processor 302 may be a component in a variety of systems. For example, the processor 302 may be part of a standard computer. In some embodiments, the processor 302 may be one or more general processors, digital signal processors, application specific integrated circuits, field programmable gate arrays, servers, networks, digital circuits, analog circuits, combinations thereof, or other now known or later developed devices for analyzing and processing data. In some embodiments, the processor 302 may implement a software program, such as code generated manually (i.e., programmed).

In some embodiments, the controller 300 may include a memory 304 that can communicate via a bus 308. In some embodiments, the memory 304 may be a main memory, a static memory, or a dynamic memory. In some embodiments, the memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Example Experimental Simulation Results

Figure 7A:
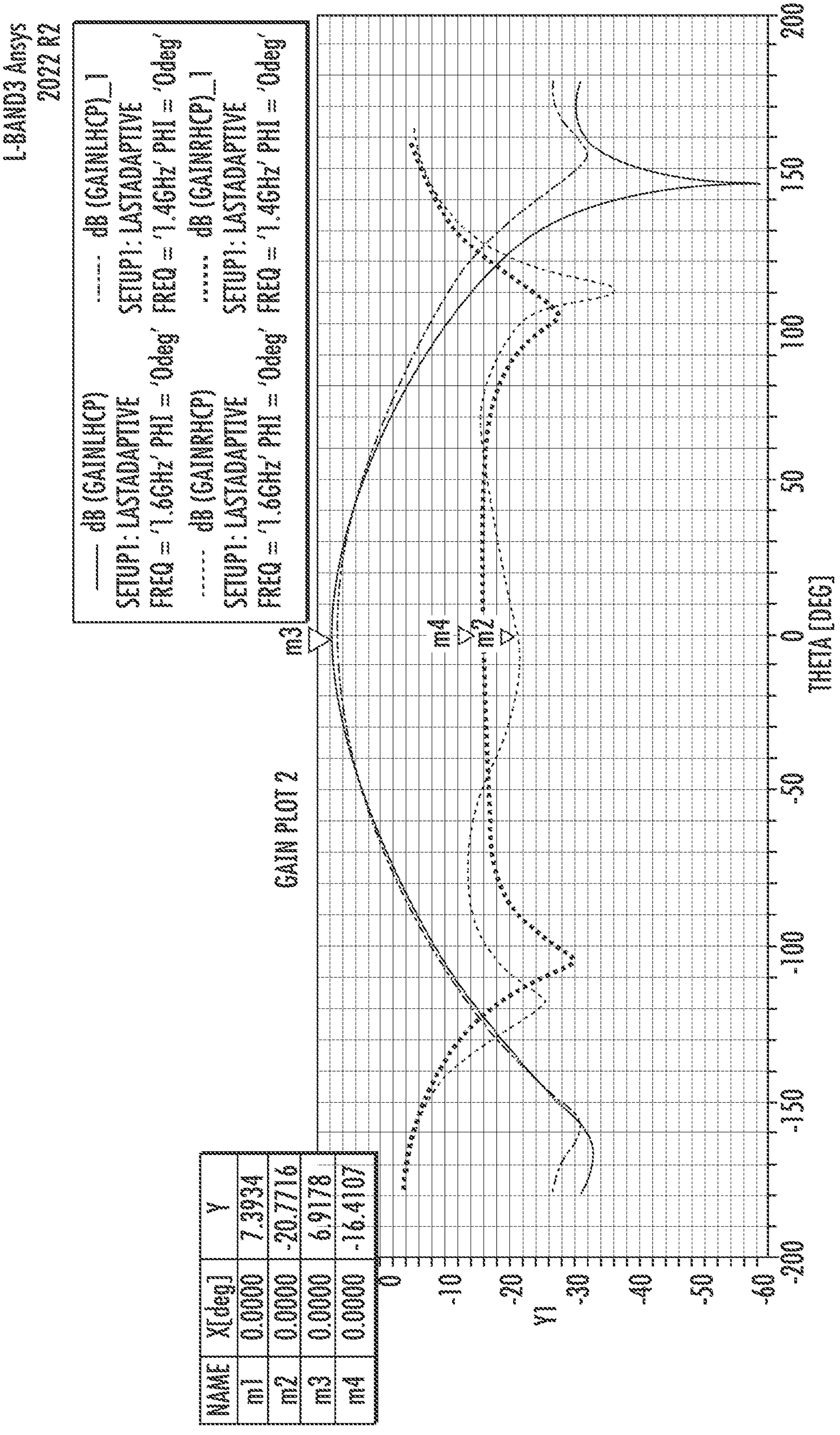
FIG. 7A is a graphical illustration of example results from a simulation of an example L-band in accordance with various embodiments of the present disclosure.
Figure 7B:
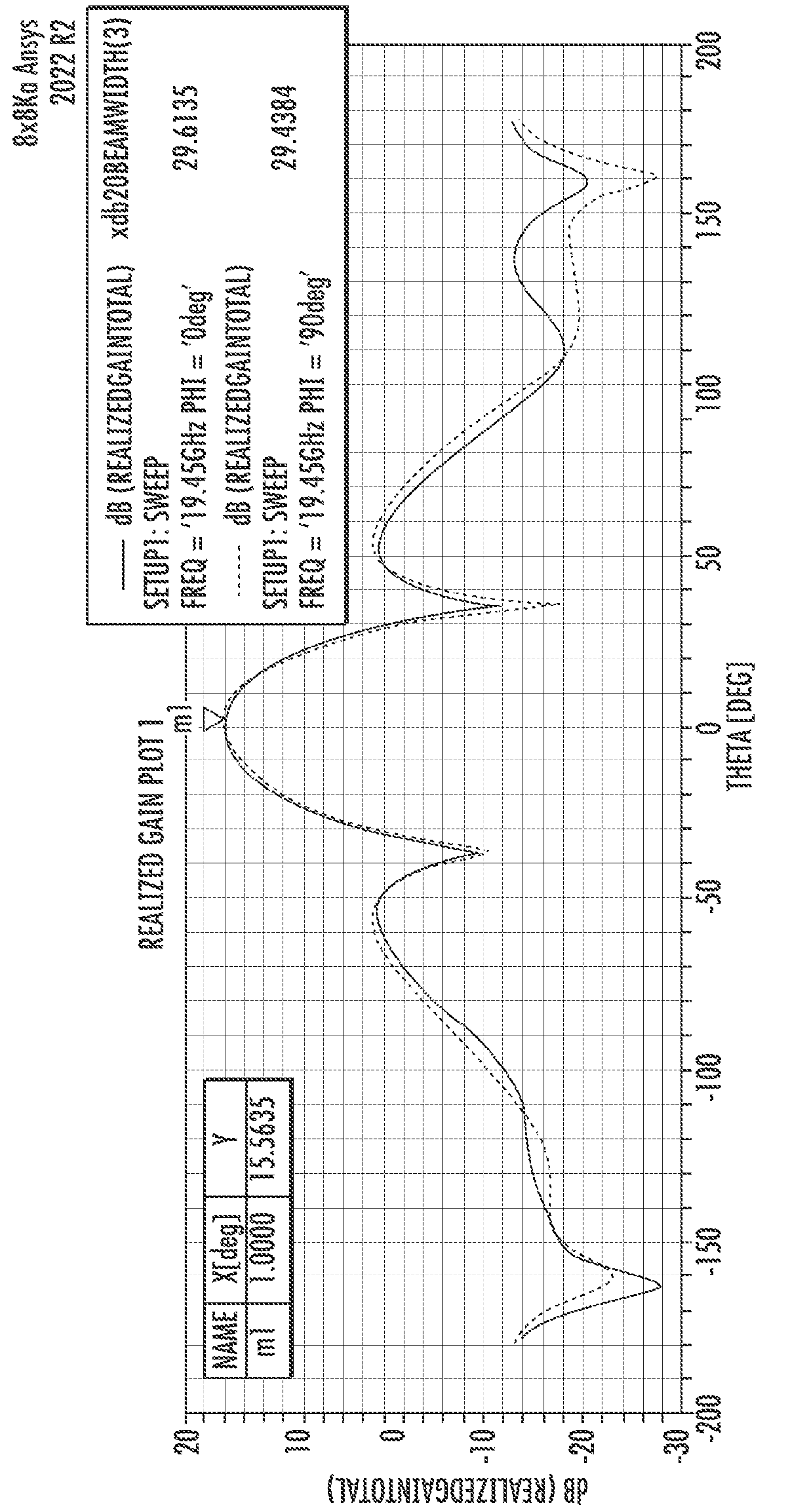
FIG. 7B is a graphical illustration of example results from a simulation of an example K/Ka-band array without an L-band mesh in accordance with various embodiments of the present disclosure.
Figure 7C:
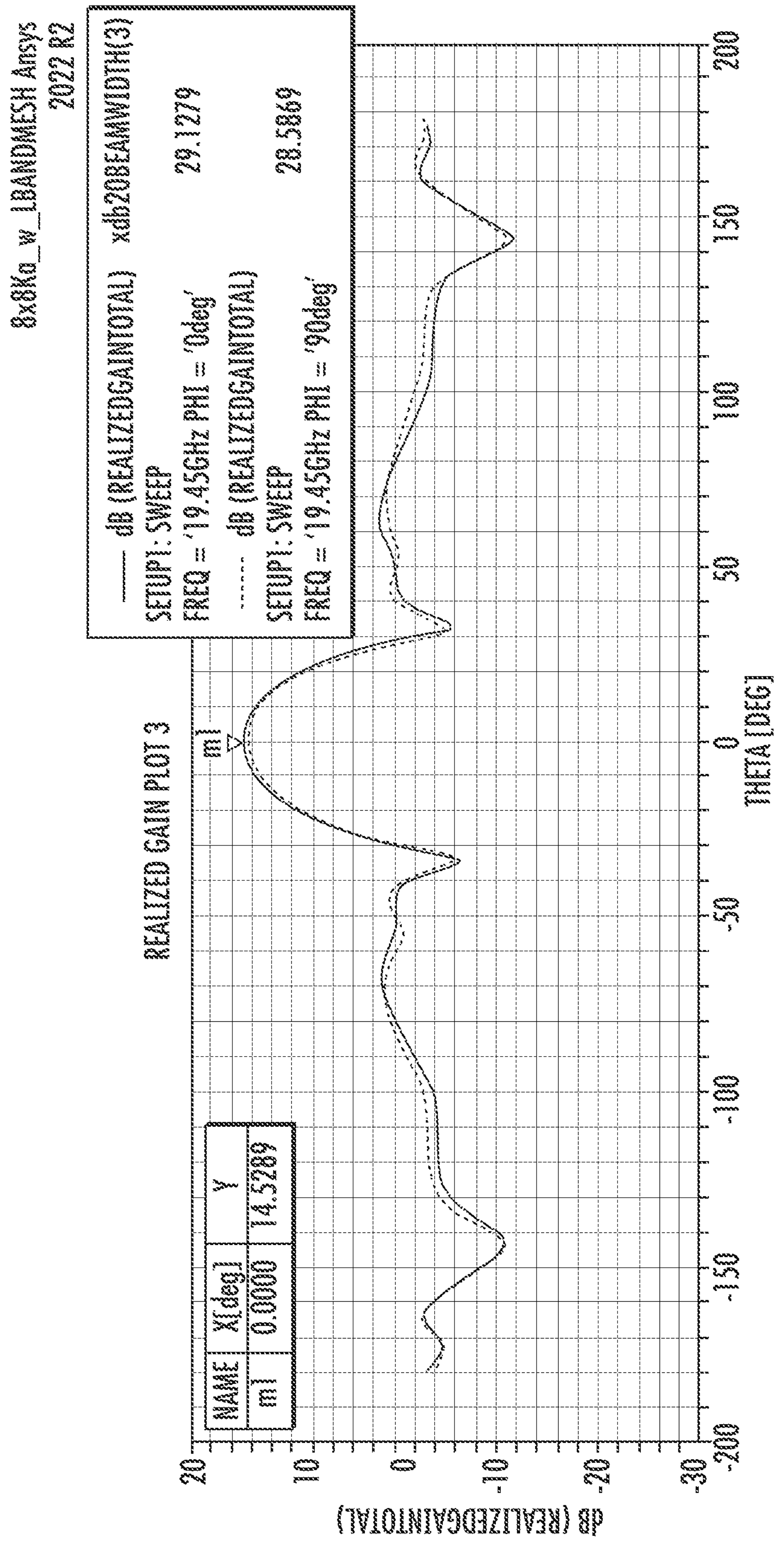
FIG. 7C is a graphical illustration of example results from a simulation of an example K/Ka-band array with an L-band mesh in accordance with various embodiments of the present disclosure.

FIGS. 7A-7C graphically illustrate simulated test results for various example antennae 100. Each graph shows realized gain for a simulated antenna. The y-axis charts total realized gain (in dB), and the x-axis charts frequency (in degrees, theta). It will be understood that these simulation results are preliminary results for simulated example antennae 100 and are not intended as definitive examples of antennae performance.

As shown in at least FIG. 7A, a simulated test using L-band perforated patches result in a decrease by 0.5 dB of element aperture gain and a frequency shift to the lower side by 6 to 8%.

FIG. 7B shows test results for a simulated example antenna where the L-band does not have a mesh, and FIG. 7C shows test results for a simulated example antenna where the L-band does have a mesh. The simulated test results show that, in some embodiments, the L-band mesh may provide an opening for the K/Ka-band radiation such that both the L-band and K/Ka-band may be used by an example antenna 100 without significant performance loss for either band. Also as shown in FIG. 7C, the mesh test results show a 1 dB gain reduction, 0.6 dB of which is directivity loss and 0.4 dB of which is mismatch loss.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An antenna comprising:

a chassis;

a plurality of printed circuit boards (PCBs) disposed on or within the chassis, a plurality of L-band antenna elements configured to transmit and receive first data, wherein the plurality of L-band antenna elements comprises an L-band perforated patch;

a plurality of K/Ka-band antenna arrays configured to transmit and/or receive second data, wherein at least one of the plurality of K/Ka-band antenna arrays is configured to transmit and/or receive at least a portion of the second data through the L-band perforated patch, wherein the plurality of L-band antenna elements and the plurality of K/Ka-band antenna arrays are disposed on the plurality of PCBs; and a controller disposed on the plurality of PCBs and configured to control the plurality of L-band antenna elements and the plurality of K/Ka-band antenna arrays.

2. The antenna of claim 1, wherein the chassis further comprises one or more heatsinks.

3. The antenna of claim 1, wherein the plurality of K/Ka-band antenna arrays comprise 4×4, 8×8, 16×16, or 64×64 K/Ka-band antenna arrays.

4. The antenna of claim 1, further comprising a ground plane corresponding to one or more of the plurality of L-band antenna elements and/or one or more of the plurality of K/Ka-band antenna arrays.

5. The antenna of claim 4, further comprising a metallic fencing electrically connected to the ground plane and configured to separate a first L-band antenna element of the plurality of L-band antenna elements from a second L-band antenna element of the plurality of L-band antenna elements.

6. The antenna of claim 5, wherein the metallic fencing comprises meshed fencing.

7. The antenna of claim 1, wherein a multilayer PCB of the plurality of PCBs comprises a plurality of L-band slots and a plurality of K/Ka band slots.

8. The antenna of claim 7, wherein the plurality of K/Ka-band antenna arrays comprise a plurality of K/Ka patches corresponding to a plurality of K/Ka-band slots.

9. The antenna of claim 8, wherein the plurality of K/Ka-band antenna arrays are further configured to transmit and/or receive the second data in GEO, LEO, or MEO.

10. The antenna of claim 8, wherein the plurality of L-band antenna elements comprise a plurality of L-band patches.

11. The antenna of claim 10, wherein the plurality of L-band patches comprise a plurality of L-band perforated top patches and a plurality of L-band perforated bottom patches, wherein the plurality of L-band perforated top patches are disposed on a first PCB of the plurality of PCBs, wherein the plurality of L-band perforated bottom patches are disposed on a second PCB, and wherein the second PCB is positioned below the first PCB.

12. The antenna of claim 11, wherein the plurality of L-band slots are disposed on a third PCB of the plurality of PCBs, and wherein the third PCB is positioned below the first PCB and the second PCB.

13. The antenna of claim 12, further comprising one or more sub-miniature push-ons (SMPs) disposed on the third PCB.

14. The antenna of claim 12, wherein the controller is disposed on a fourth PCB of the plurality of PCBs, and wherein the fourth PCB is positioned below the first PCB, the second PCB, and the third PCB.

15. The antenna of claim 14, further comprising one or more RF chains disposed on the third PCB and the fourth PCB.

16. The antenna of claim 1, further comprising one or more frames disposed between the plurality of PCBs.

17. The antenna of claim 16, wherein the one or more frames comprise an electromagnetic interference (EMI) shielding configured to shield the plurality of L-band antenna elements.

18. The antenna of claim 1, wherein the plurality of PCBs are disposed within the chassis such that one or more airgaps exist between two or more PCBs of the plurality of PCBs.

19. The antenna of claim 18, wherein the one or more airgaps separate the two or more PCBs at a distance between 5 and 10 millimeters.

* * * * *